United States Patent [19]

Franzen et al.

[11] 4,375,711
[45] Mar. 8, 1983

[54] REMOVABLE COVER HINGE FOR FOOD CONTAINERS

[76] Inventors: Raymond E. Franzen, 12720 Stoneridge Rd.; Eugine W. Goad, 12711 Cedarwood Ct., both of Dayton, Minn. 55327; Richard W. Stone, 15860 Nowthen Blvd., Anoka, Minn. 55303

[21] Appl. No.: 123,652

[22] Filed: Feb. 22, 1980

[51] Int. Cl.³ .................. A47J 36/12; E05D 5/02; E05D 7/12

[52] U.S. Cl. ............... 16/252; 220/85 CH; 220/335

[58] Field of Search ............. 16/130, 149, 158, 181, 16/187, 252, 253, 257, 259; 220/85 CH, 335

[56] References Cited

U.S. PATENT DOCUMENTS

| | | | |
|---|---|---|---|
| 369,113 | 8/1887 | King, Jr. | 16/252 |
| 498,569 | 5/1893 | Peterson | 16/149 X |
| 626,023 | 5/1899 | Hoage et al. | 220/85 CH |
| 689,315 | 12/1901 | Krueger | 16/252 X |
| 1,145,521 | 7/1915 | Stock | 16/252 |
| 1,187,866 | 6/1916 | Schnebelin | 16/149 X |
| 1,258,503 | 3/1918 | Tritle | 16/158 X |
| 1,476,966 | 12/1923 | Hachmann | 16/252 |
| 1,928,995 | 10/1933 | De Biasi | 220/85 CH |
| 2,239,373 | 4/1941 | Schatzman et al. | 16/257 |
| 2,541,604 | 2/1951 | Normandin | 220/85 CH |
| 4,327,846 | 5/1982 | Starp | 220/335 X |

FOREIGN PATENT DOCUMENTS 808023 1/1959 United Kingdom .................. 16/158

Primary Examiner—Wm. Carter Reynolds
Attorney, Agent, or Firm—John W. Adams

[57] ABSTRACT

This is a removable hinge mechanism particularly designed for use with steam table food containers for removably attaching a separate cover to the upper portion of the container, thus providing a support for holding the cover when the same is lifted from the container to provide access to the food confined therewithin.

The hinge mechanism is attached to the container by a releasable clamping action between the inner and outer portions of the rolled edge or flange formed at the top of the container and to the cover by an open-ended loop to permit complete removeability from the container and the cover for cleaning.

4 Claims, 13 Drawing Figures

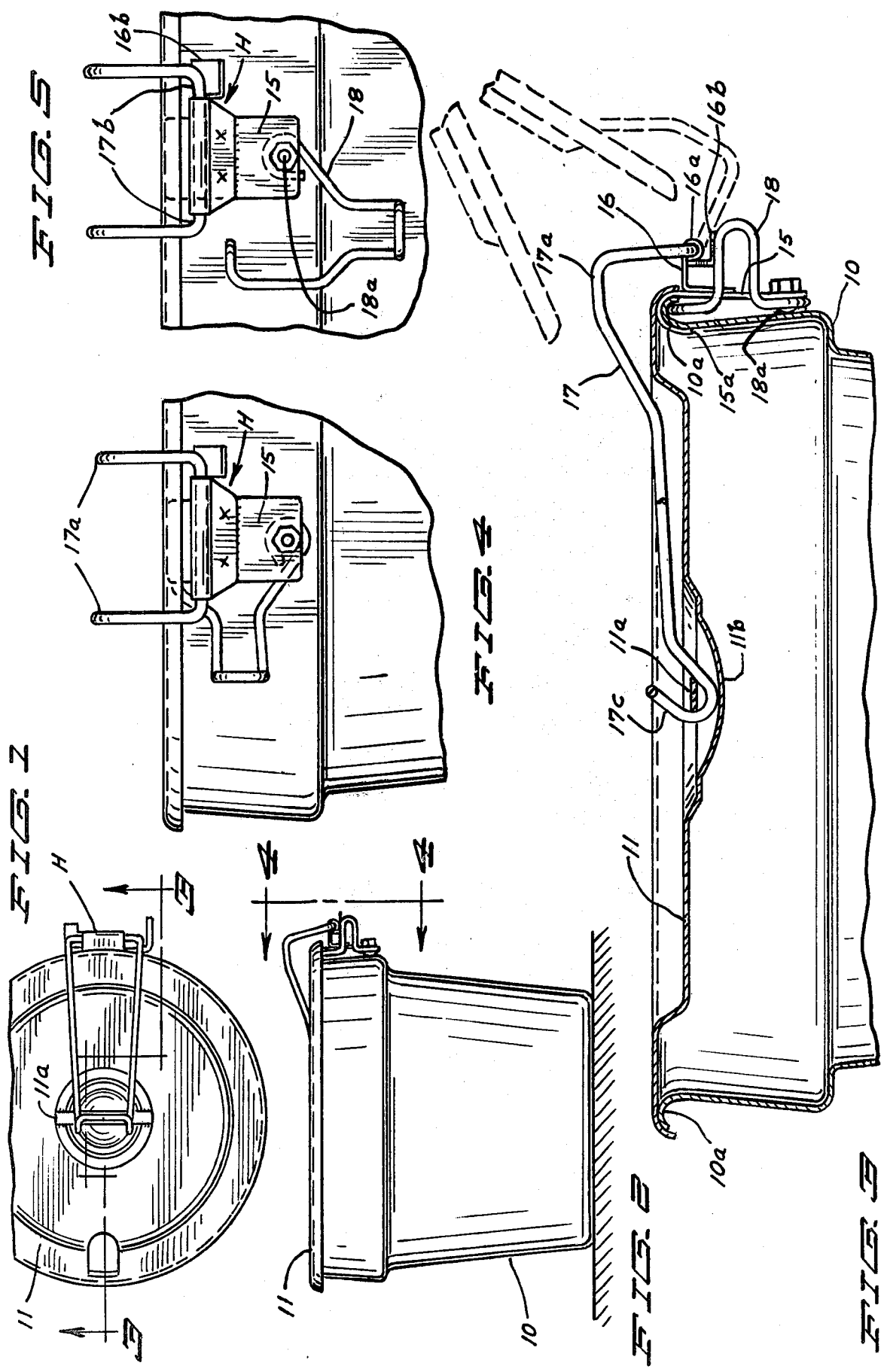

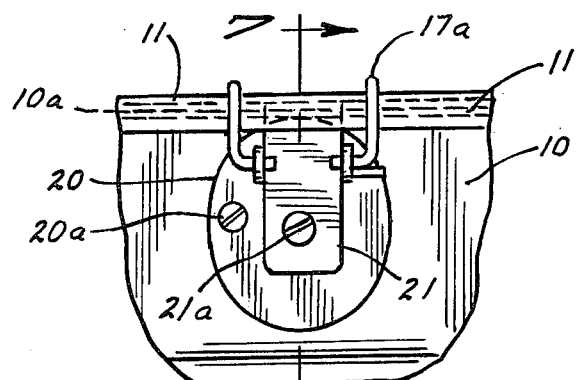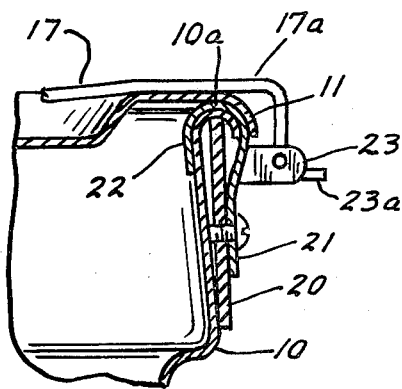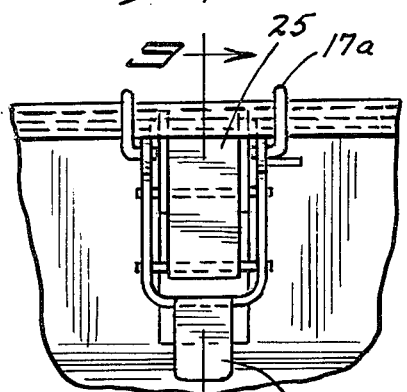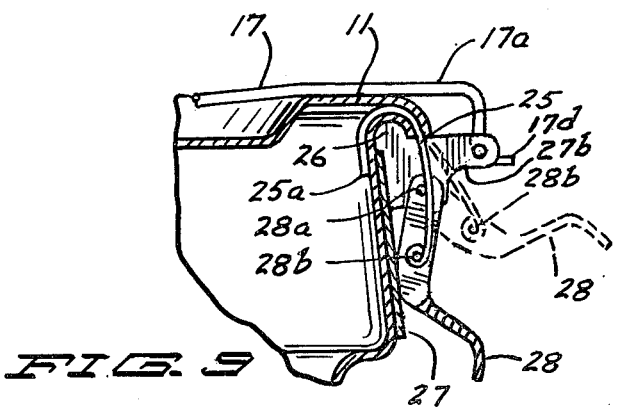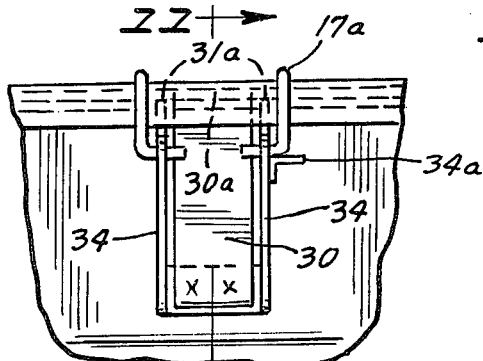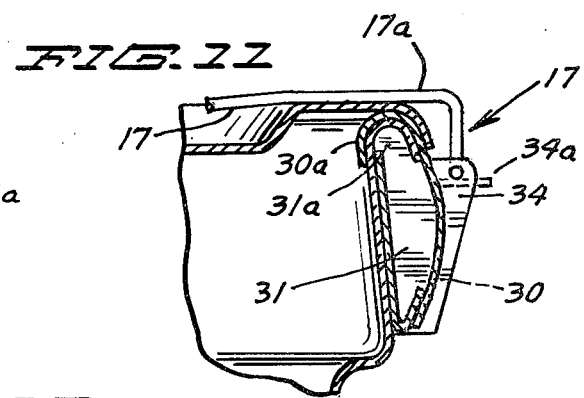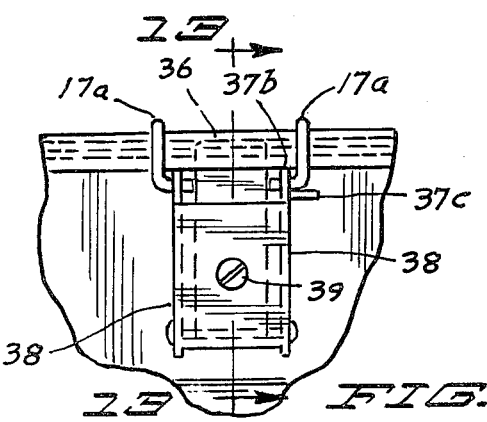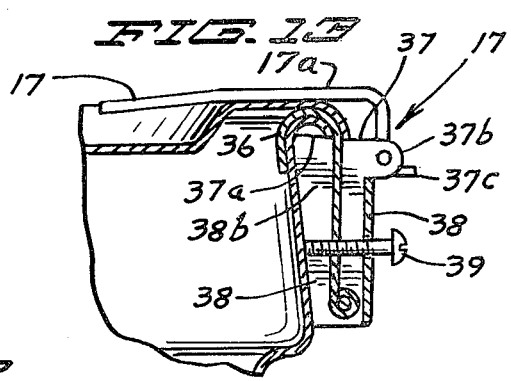

REMOVABLE COVER HINGE FOR FOOD CONTAINERS

BACKGROUND OF THE INVENTION

Conventional steam table food containers have completely separate covers which must be manually removed by the operator and placed in some temporary storage space which is usually at a premium or is actually unavailable in order to permit the food to be served. The removable cover hinge attachment embodying this invention eliminates the necessity of putting the cover down and provides a support for the cover when lifted from the container. The removability of the hinge mechanism permits the necessary and required cleaning of the respective parts.

SUMMARY OF THE INVENTION

This invention constitutes a removable cover hinge assembly for steam table food containers and the like and includes a number of different forms of clamping mechanisms for removably attaching a cover hinge arm to the rolled flange at the top of the container which is conventionally easily removed for thorough cleaning.

In all forms of the invention, the hinge assembly includes a pair of clamping elements for removably attaching the same to a container. A hinge arm is pivotally connected at one end to one of said clamping elements and has means such as a handle-receiving loop for attaching the other end to a handle of the container cover. In one form of the invention, the clamping elements include a hook element and a clamping spring arm having one end pivotally mounted on a mounting plate which connects said two clamping elements, said spring arm being engageable with the underside of the rolled flange of the container to clamp the hook against the top of said flange. The hinge arm is pivotally connected with the mounting plate and is provided with a clearance arch which passes around the edge of the cover and permits the arm to be attached at its free end to the handle of the container cover.

Another form of the invention the spring arm is replaced by an eccentric clamping element underlying the hook element and is rotatably mounted on the lower portion of the mounting plate to positively engage the underside of the rolled flange of the container and clamp the hook element against the upper surface rolled flange when in clamping position. Still another form of the invention one clamping element is formed by a spring arm which has a hook at the upper end for engagement against the upper surface of the rolled container flange and is mounted at its lower portion on the mounting plate by means of an over-center linkage. The upper end of the mounting plate forms the other clamping element for engaging the underside of the rolled flange, to permit removeable attachment of the cover hinge arm to the container.

Another form of the invention embodies a spring arm which is connected at its lower end to the lower end of the mounting plate and has a hook element at its upper end which combines with a retaining element formed at the upper end of the mounting plate to permit the hook element and the retaining element to be pivotally swung onto the rolled flange of the container and resiliently clamped thereto.

Still another form of the invention is provided in which the hook element is pivotally attached at its lower end to a mounting plate which has a retaining element formed at the upper end and a clamping screw is threadably inserted through the hook element to engage the mounting plate and securely clamp the hook and retaining elements onto the rolled flange of the container.

DESCRIPTION OF THE DRAWINGS

FIG. 1 is a fragmentary top plan view of one form of the invention;

FIG. 2 is a front elevation thereof;

FIG. 3 is a fragmentary vertical section taken substantially along the line 3—3 of FIG. 1 and showing the cover in raised position by dotted lines;

FIG. 4 is a fragmentary side elevation showing the spring arm retaining element in this form of the invention in clamping position;

FIG. 5 is a similar view showing the spring arm in released position;

FIGS. 6, 8, 10 and 12 are fragmentary side elevational views respective showing modified forms of the invention; and FIGS. 7, 9, 11 and 13 are fragmentary sectional views thereof respectively taken substantially along the indicated section lines of FIGS. 6, 8, 10 and 12.

DETAILED DESCRIPTION OF THE DEVICE ILLUSTRATED

FIGS. 1–5 show one form of the invention. A conventional steam table container 10 is illustrated and has a rolled flange 10a having a generally horizontal portion with top and bottom clamp-receiving surfaces. The hinge assembly H includes a pair of clamping elements which removably attach the assembly to the container 10 from both above and below the rolled top flange 10a. The container is clamped from above by a clamping hook element 15a and from below by an underlying clamping element in the form of a spring arm 18. The hook 15a overlies a portion of the rolled flange 10a and is fixed to the upper end of mounting plate 15, as by being a continuation thereof.

In this form of the invention, the container flange 10a is clamped from below by the retaining spring arm 18, which is pivotted on the mounting plate 15 by a pivot pin 18a extending generally perpendicular to the mounting plate. The arm 18 engages the underside of rolled flange 10a and anchors the clamping hook 15a against the top of the rolled flange 10a.

A hinge bracket 16 is secured to the mounting plate 15. A cover-connecting hinge arm 17 is pivotally mounted on one end to hinge bracket 16 as by a bushing 16a. The connecting hinge arm 17 has a clearance arch 17a formed with a pair of pivot elements 17b journalled in the bushing 16a. A conventional cover 11 having a cover handle 11a is illustrated and the free end of the hinge arm 17 is connected with the cover handle 11a as by an open ended loop 17c which permits the cover to be swung up into and retained in removed position as shown by dotted lines in FIG. 3, as by a stop element 16b shown in FIGS. 3, 4 and 5. The loop 17c is constructed to frictionally engage the handle 11a of the cover 11. This frictional engagement is maintained by the bifurcated construction of the arm 17 and the cover hook element 17c. The undersides of the two opposed portions of the hook element engage the recess of the cover 11b as best shown in FIGS. 1 and 3 which urges the underside of both of said hook elements upwardly and this engagement between the hook 17c and the cover handle 11a permits the operator to maintain the cover at a desired angle so that the edge of the cover can be positioned to drip back into the container 10 as shown by the upper dotted line position in FIG. 3. This prevents the cover from dripping ouside of the container as it would in the lower dotted position in FIG. 3. This frictional engagement between the cover hook 17c and handle 11a is present in all forms of the invention.

FIGS. 6–13 show other forms of the invention. The form shown in FIGS. 6 and 7 has as the clamping element which engages the underside of rolled flange 10a, an eccentric clamping element 20 rotatably mounted on a pivot element 21a carried by mounting plate 21 and extending generally perpendicular to the plate. The eccentric clamping element 20 is tightened against the flange 10a by a screw head gripping knob 20a to rotate the element 20 in a clockwise direction. The mounting plate 21 has a clamping hook 22 formed at the top thereof, which engages the upper part of rolled flange 10a. A hinge bracket in the form of a pair of pivot ears 23, connect the hinge arm 17 to the mounting plate 21, in the form of the invention, illustrated in FIGS. 6 and 7 previously described. A suitable stop element 23a is provided.

FIGS. 8 and 9 show another modified form of the invention wherein the two clamping elements are formed by an over-center clamping buckle element 25 and retaining elements 26 formed at the top of a mounting plate 27. The retaining elements 26 engage the underside of rolled flange 10a. The clamping buckle 25 has a flange-engaging hook 25a formed at the top thereof which engages the top of flange 10a and the clamping buckle 25 is pivotally connected by pivot pin 28b at its lower end to an intermediate portion of an over-center actuating lever 28. A pivot pin 28a pivotally connects the upper end of lever 28 to a pair of spaced apart mounting ears 27b fixed to opposite sides of mounting plate 27. A second pivot pin 28b connects an intermediate portion of lever 28 to the outside lower end of buckle hook 25a. The mounting ears 27a also attach hinge arm 17 to plate 27. The ears 27a are designed to permit the actuating lever 28 to be raised into hook releasing position, as shown by the dotted lines in FIG. 9.

An over-center locking action is produced when the pivot pin 28b passes beyond a plane through the clamp engaging portion of rolled flange 10a and pivot pin 28a, as best shown by the full lines in FIG. 9. A suitable stop element 17d is provided on the ears 27a to limit the swinging movement of hinge arm 17 and support the arm and cover in removed position.

FIGS. 10 and 11 show another modification which includes a leaf spring 30 which is fixed at its lower end to the bottom of mounting plate 31 which forms a retaining element 31a at the top thereof. A hook element 30a is formed at the top of leaf spring 30. The retaining element 31a and the leaf spring 30 spring apart sufficiently to permit both clamping elements 30a and 31a to be swung into clamping position on rolled flange 10a. A hinge bracket 34 includes a stop 34a and is fixed to mounting plate 31 and to a hinge arm 17 as in the first form of the invention.

The form shown in FIGS. 12 and 13 has a hook element 36 which is pivotally mounted at the bottom of mounting plate 38. Retaining elements 37a are formed at top of mounting plate 38. A clamping screw 39 threadably extends through the outer lower arm portion of hook element 36 and engages the side of the container to clamp hook 36 and retaining elements 37a against the rolled flange 10a. The hinge ears 37b are fixed to mounting plate 38 and provide pivotal mountings for the hinge arm 17, as in the first form of the invention. The upper end of mounting plate 38 forms the retaining elements 37a. A stop element 37c is also provided.

It will be seen that all forms of the invention provide a pair of clamping elements for releasably connecting a cover hinge assembly to a container.

What is claimed is:

1. A removable hinge assembly for attaching a cover to an open top container of the type having an outwardly extending rolled flange formed around the open top thereof, whereby the flange forms a generally horizontal portion having top and bottom clamp receiving surfaces, said assembly comprising:
    an overlying hook element for clamping engagement with the top clamp-receiving surface of the rolled flange and extending at least partially around the flange,
    a mounting plate extending downwardly in fixed relation to said hook element for positioning on the outside of the container below said flange,
    a pivot element connected to said mounting plate below said flange and extending generally perpendicular to said plate,
    an underlying clamping member pivotally mounted on said pivot element for pivotal movement into and out of clamping position against the bottom clamp-receiving surface of the flange for positively holding said mounting plate on said flange, and
    a lid-connecting hinge arm hingedly connected to said mounting plate and having means for connecting the same to a cover for said container to provide a removable hinge connection between the cover and the container.

2. The structure set forth in claim 1 wherein said clamping member constitutes a spring arm element having one end pivotally connected to said pivot element to permit said arm to be releasably swingable into underlying locking engagement with the bottom clamp receiving surface of the flange.

3. The structure set forth in claim 1 wherein said underlying clamping member constitutes an eccentric.

4. The structure set forth in claim 1 wherein the cover has a handle and said hinge arm for connecting the mounting plate and cover includes a bifurcated arm structure pivotally connected at one end to said mounting plate,
    said means for connecting the hinge arm to the cover handle including an open ended loop at the other end of the hinge arm and constructed to frictionally engage the cover handle of the container cover to permit the angle between the cover and said arm to be adjusted when the cover is in raised position.

* * * * *